US008253272B2

(12) United States Patent  (10) Patent No.: US 8,253,272 B2
Schulzman  (45) Date of Patent: Aug. 28, 2012

(54) FAN CONTROLLER WITH 8-BIT SIGNAL ENCODING
(75) Inventor: Kurt Schulzman, Long Beach, CA (US)
(73) Assignee: Minka Lighting, Inc., Corona, CA (US)
( * ) Notice: Subject to any disclaimer, the term of this patent is extended or adjusted under 35 U.S.C. 154(b) by 530 days.
(21) Appl. No.: 12/485,486
(22) Filed: Jun. 16, 2009
(65) Prior Publication Data
US 2010/0314941 A1  Dec. 16, 2010
(51) Int. Cl.
*H02J 3/14* (2006.01)
(52) U.S. Cl. .......................................... 307/40; 307/155
(58) Field of Classification Search .................. 307/40, 307/155
See application file for complete search history.

(56) References Cited

U.S. PATENT DOCUMENTS

| | | | | |
|---|---|---|---|---|
| 4,538,973 | A * | 9/1985 | Angott et al. .................. | 417/572 |
| 4,818,920 | A * | 4/1989 | Jacob ............................... | 318/16 |
| 5,041,825 | A | 8/1991 | Hart et al. | |
| 5,189,412 | A * | 2/1993 | Mehta et al. ................ | 340/12.24 |
| 5,365,154 | A * | 11/1994 | Schneider et al. ............ | 318/103 |
| 6,120,262 | A * | 9/2000 | McDonough et al. ..... | 417/424.1 |
| 7,425,805 | B2 * | 9/2008 | Hsu .................................. | 318/16 |

OTHER PUBLICATIONS

Holtek; HT93LC46/56/66 Memory Devise; 1K/2K4K 3-Wire CMOS Serial EEPROM; printed from www.holtek.com; dated Aug. 7, 1998.
Holtek; HT12A/HT12E; $2^{12}$Series of Encoders; printed from www.holtek.com; dated Apr. 11, 2000.
Holtek; HT12D/HT12F; $2^{12}$Series of Decoders; printed from www.holtek.com; dated Nov. 18, 2002.
Holtek; HT-12E/HT-12F Data Sheet; printed from www.sprocket.telab.artic.edu.ed/ATS3203; printed on Oct. 5, 2009.
Micon Design Technology Co,; MDT10P21 Data Sheet; printed from www.datasheet.pro.com on Oct. 5, 2009.

* cited by examiner

*Primary Examiner* — Hal Kaplan
(74) *Attorney, Agent, or Firm* — Baker & McKenzie LLP (57) ABSTRACT

A self-programmable control system for an electronic device is disclosed. The electronic device may comprise a ceiling fan and associated light fixtures, wherein the ceiling fan is manufactured to be coupled with an AC power source, and includes a motor with associated connection wires for rotating fan blades. Such ceiling fan system may further include at least one lower light fixture, and one upper light fixture, with associated connection wires for adjusting light intensity. The control system may utilize a plurality of wireless or hard-wired controllers, wherein each controller contains a transmitter configured to encode and transmit a control signal from the controller to a receiver. The control system further includes a receiver adapted to receive the encoded control signals, decode the instruction, and provide the decoded instruction to a component of the electronic device. The receiver is adapted to operate in several different modes, including a dimmer mode and a programming mode, whereby the remote transmitters may adjust the illumination intensity and the receiver may program itself to receive instructions only from a specific controller.

27 Claims, 11 Drawing Sheets

FAN CONTROLLER WITH 8-BIT SIGNAL ENCODING

BACKGROUND

1. Technical Field

This invention relates to encoded control systems, and more specifically, to a device for controlling a ceiling fan and its associated light fixtures, and a method wherein the transmission of a signal is encoded.

2. Background of the Related Art

Current ceiling fan systems may comprise a motor, fan blades, at least one light fixture located below the fan blades, a light fixture located above the fan blades, and a device to control the ceiling fan system, such as an AC-coupled wall control unit. Such a device for controlling a ceiling fan system is inefficient as these devices utilize a method of control in which control signals are sent from the control unit to the ceiling fan by modulating them onto the AC power line, thus reducing the AC power to the fan, causing unwanted fluctuations in the fan speed and light intensity.

Such wall control units also lack variation in functionality, as most only provide the ability to turn off and on the fan and its associated light fixtures, and do not allow for user-defined variations in the light intensity and fan speed. Further, the few wall control units that do allow greater user-control do not feature the ability to adjust the direction of fan blade rotation.

It is desirable to control fan and light settings through use of a remote control system in addition to the wall-mounted controller. A remote control system can utilize wireless communication between a transmitter and a receiver over some sort of wireless medium, such as Radio Frequency (RF) or infrared light (IR). Such a method can suffer from interference from other wireless controllers using the same wireless medium. Accordingly, it is advantageous to encode the transmitted signal so that only the desired receiver only receives commands from the desired transmitter, thereby eliminating interference from other sources. It is also desirable to provide a self-programmable receiver for receiving the encoded instructions from the remote controller so that the receiver can be readily programmed to work with different remotes.

SUMMARY

Disclosed is a control system powered by an Alternating Current (AC) power source. The electronic device to be controlled may comprise a ceiling fan and associated light fixtures, wherein such ceiling fan is manufactured to be coupled with an AC power source, and includes a motor with associated connection wires for rotating fan blades. Such ceiling fan system may further include at least one lower light fixture, and one upper light fixture, with associated connection wires for adjusting light intensity.

The controlling system may include a plurality of wireless controllers, wherein each controller contains a transmitter tailored to encode and deliver a wireless control signal from said controller to the receiver. In accordance with one embodiment of the invention, a control signal, which contains an instruction to be executed by the receiver, is encoded by the controller prior to being transmitted via a wireless medium such as Radio Frequency (RF) or infrared light (IR), and is decoded by the receiver prior to execution. By encoding the control signals sent by a particular transmitter, only the intended receiver will be able to process the control signals and execute the desired function.

The control system may comprise at least one portable remote controller powered by a Direct Current (DC) power source, such as a battery. The remote controller may also comprise an encoding device with eight code switches, wherein each code switch has an "On/Off" position. The encoding device may further comprise a Holtek HT 12A integrated circuit, which is commercially available. The eight code switches can be connected to address pins of the HT12A integrated circuit so that the desired code can be provided directly to the encoding circuit. The remote controller user interface may further comprise two switches designated to control the light fixtures associated with the ceiling fan, four switches to control the fan speed setting, and one switch to reverse the direction of fan blade rotation. In accordance with an embodiment of the invention, the remote controller generates and encodes control signals, then transmits the encoded control signals to the receiver via a wireless transmission medium. According to another embodiment, the transmission medium may comprise a wired connection between the controller and the receiver.

The control system may further comprise at least one stationary controller, wherein said controller is tailored to be mounted on a fixed structure, such as a wall, and is powered by an AC power source. The stationary controller may comprise an encoding device with eight code switches, wherein each code switch has an "On/Off" position. The stationary controller user interface may comprise two switches designated to control the light fixtures associated with the ceiling fan, and four switches to control the fan speed setting. The stationary controller may further comprise one switch to reverse the direction of fan blade rotation, and one toggle switch to power the receiver on and off. In accordance with an embodiment of the invention, the stationary controller generates and encodes code signals, then transmits said control signals to the receiver via a wireless transmission medium. According to another embodiment, the transmission medium may comprise a wired connection between the controller and the receiver.

The control system may further comprise a receiver that includes a Radio Frequency (RF) receiver, wherein said receiver receives encoded control signals from transmission devices. The receiver may decrypt the control signals, extract and process the control instruction, and operate the fan motor and associated light fixtures in a manner that is compliant with said control instruction. In one embodiment of the invention, both the stationary controller and the portable remote controller are adapted to transmit a control signal to the receiver via the same transmission medium.

Additional advantages, objects, and features of the disclosure will be set forth in part in the description which follows and in part will become apparent to those having ordinary skill in the art upon examination of the following or may be learned from practice of the disclosure.

BRIEF DESCRIPTION OF THE DRAWINGS

Disclosed embodiments will be described in detail with reference to the following drawings, in which like reference numerals refer to like elements, wherein.

DETAILED DESCRIPTION

Control System Overview

Figure 1:
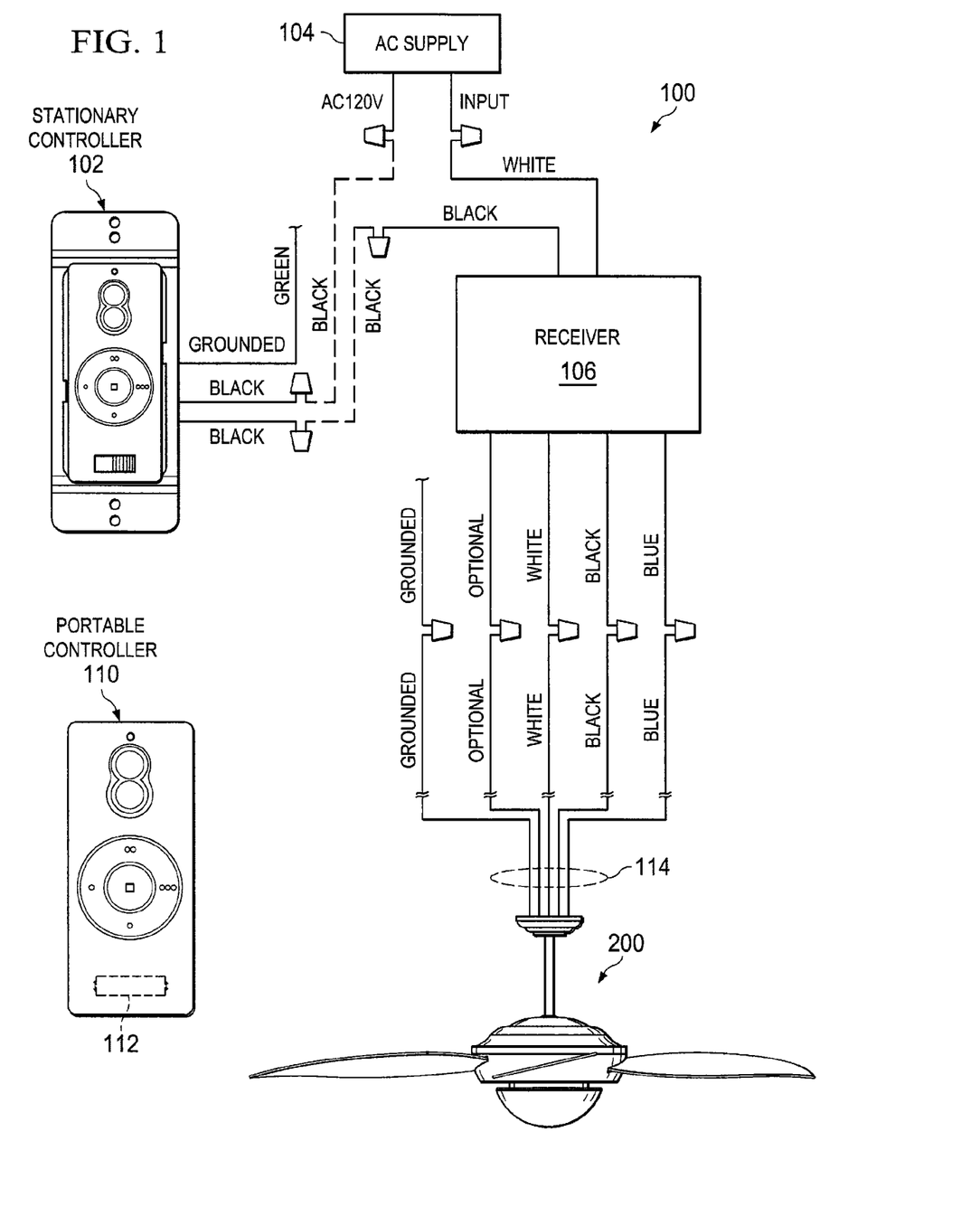
FIG. 1 is a schematic diagram illustrating an exemplary control system.

FIG. 1 is a schematic diagram illustrating an exemplary control system 100, wherein said control system includes a stationary controller 102 connected to an AC power source 104; a receiver 106 connected to an AC power source 104 and ceiling fan system 200; and a portable controller 110 connected to a DC power source 112. The exemplary control system 100 further includes a wiring schematic 114 for connecting the receiver 106 to the ceiling fan system 200.

Figure 2:
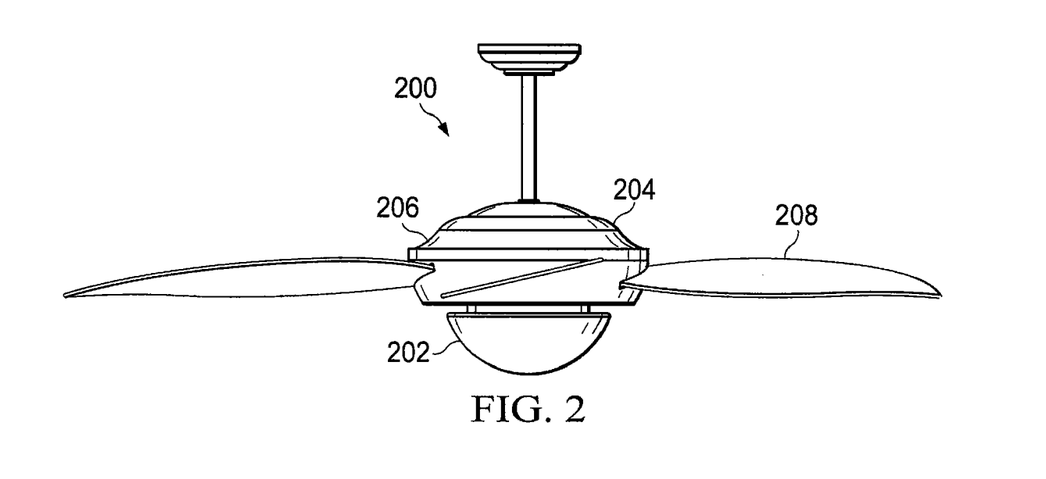
FIG. 2 is a schematic diagram of a ceiling fan system, consisting of a lower light fixture, upper light fixture, fan blades, and a motor.

FIG. 2 provides a schematic diagram of a representative ceiling fan system 200 comprised of at least one lower light fixture 202, an upper-light fixture 204, a motor 206, and fan blades 208, wherein said motor 206 is powered by an AC power supply 104 and rotates said fan blades 208 at a desired speed and direction.

Figure 3:
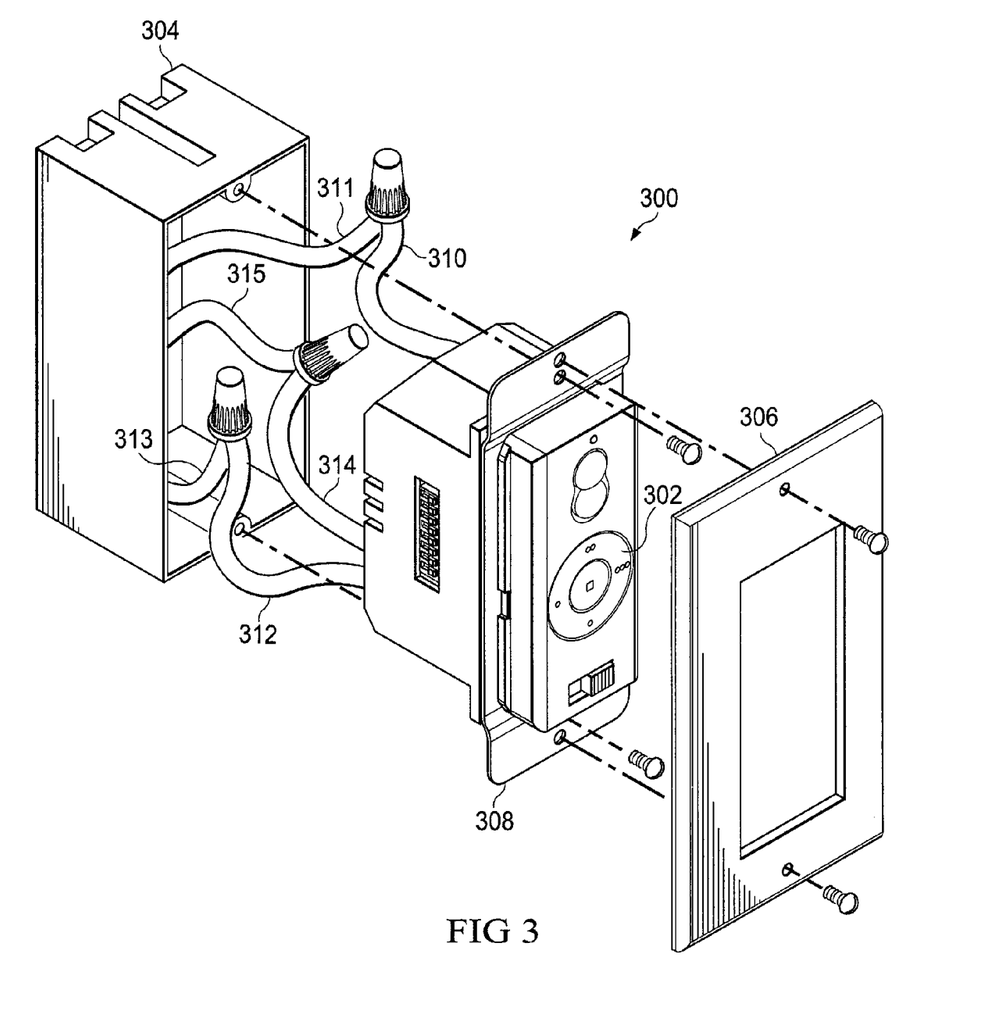
FIG. 3 is a diagram illustrating an exploded view of an exemplary stationary controller in a light or ceiling fan control unit wall housing.

As illustrated in FIG. 3, one embodiment of the stationary controller 302 may be mounted into a light or ceiling fan control unit wall housing 304 with a faceplate 306 installed on top of the controller mounting unit 308. Such installation further includes connecting a ground wire 310 of the controller to a grounding wire 311 in the wall housing unit 304, connecting a first power wire 312 of the controller to a first power wire 313 in the wall housing unit 304, and connecting a second power wire 314 of the controller to a second power wire 315 in the wall housing unit 304. The first power wires 312 and 313 connect the stationary controller to the AC power supply 104, while the second power wires 314 and 315 connect the stationary controller to the control unit 106. After connecting the first power wires 312 and 313, connecting the second power wires 314 and 315, and grounding the ground wire 310 of FIG. 3, AC power is able to flow from the AC power supply 104, through the stationary controller 102, and to the receiver 106 of FIG. 1.

Portable Controller

Figure 4A:
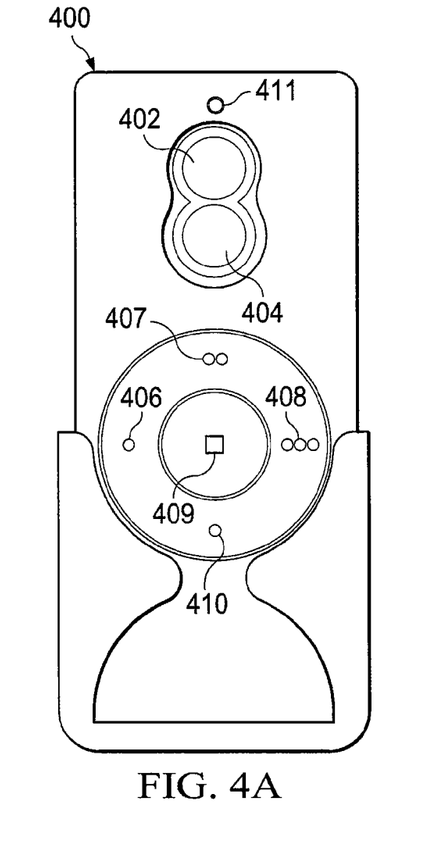
FIGS. 4A, 4B and 4C are diagrams illustrating the user interface and code switches for a portable controller.

FIG. 4A illustrates an exemplary portable remote controller 110 used to instruct the receiver 106 to control the ceiling fan system 200. The front surface 400 of the controller 110 features a plurality of push switches acting as the user interface system, wherein the light-controlling switches 402 and 404 control the illumination of the lower 202 and upper 204 light fixtures on the ceiling fan system 200; the fan-controlling switches 406, 407, 408, 409, and 410 provide the fan motor 206 with the desired speed and direction of fan blade 208 rotation; and the indicator light 411 illuminates to inform the user that the controller 110 has recognized that a switch is pressed. An encoding device, such the commercially available HT12E encoder, may also be incorporated into the controller 106 to encode signals that are to be sent from the portable controller 110 to the receiver 106.

The light-controlling switches featured on the front surface 400 of the portable remote controller 110 are "Up-Light" switch 402 and "Down-Light" switch 404. In one embodiment of the invention, when the "Up-light" switch 402 is pressed for less than a first period of time (e.g., less than 0.7 seconds), the receiver 106 will operate in "normal mode." In the "normal mode," the controller 110 generates and transmits an encoded control signal to the receiver 106. Upon receiving this signal, the receiver 106 provides power to the fan's associated light fixtures 202 and 204. If the light fixtures 202 and 204 are already powered on, this control instruction turns the power off to the light fixtures 202 and 204. In another embodiment of the invention, when the "Down-Light" switch 402 is pressed for less than a first period of time (e.g., less than 0.7 seconds), the receiver 106 will operate in "normal mode." In the "normal mode," the controller 110 generates and transmits an encoded control signal to the receiver 106. Upon receiving this signal, the receiver 106 removes power from the fan's associated light fixtures 202 and 204. If the light fixtures 202 and 204 are already powered off, this control instruction turns the power on to the light fixtures 202 and 204.

In accordance with an embodiment of the invention, when either the "Up-Light" switch 402 or the "Down-Light" switch 404 are pressed for longer than the first period of time (e.g., greater than 0.7 seconds), the receiver 106 enters "dimmer mode." The receiver 106 will operate in the "dimmer mode" until it returns to "normal mode" operation. When the light-controlling switches "Up-Light" 402 and "Down-Light" 404 are pressed while the controller is operating in "dimmer mode," the light control switches gradually adjust the illumination intensity of the lower 202 and upper 204 light fixtures, wherein said adjustment of light intensity varies periodically (e.g., every 0.8 seconds). For example, if the receiver 106 is operating in "dimmer mode," and the user presses the "Up-Light" switch 402, the controller 110 generates and transmits an encoded control signal to the receiver 106. Upon receiving the encoded control signal, the receiver 106 decodes the signal and gradually increase the intensity, or brightness, of the fan's associated light fixtures 202 and 204. Once the light fixtures 202 and 204 reach their maximum intensity, the intensity will pause briefly, then gradually start to decrease. The receiver will continue to cycle through increasing and decreasing intensity until the user stops pressing the "Up-Light" switch 402. Conversely, if the receiver 106 is operating in "dimmer mode," and the user presses the "Down-Light" switch 404, the controller 110 generates and transmits an encoded control signal to the receiver 106. Upon receiving the encoded signal, the receiver 106 gradually decreases the intensity of the light fixtures 202 and 204. Once the light fixtures 202 and 204 are at minimum intensity, the intensity will pause briefly, then gradually start to increase. The receiver will continue to cycle through increasing and decreasing intensity until the user stops pressing the "Down-Light" switch 402. Or, according to another embodiment of the invention, the cyclical change in light intensity may continue for as long as the user depresses a light-control switch while the controller 110 is operating in "dimmer mode," or the light fixtures 202 and 204 reach their maximum or minimum intensity. In accordance with another embodiment of the invention, when the controller 110 is operating in "dimmer mode," and the user waits for longer than a second period of time (e.g., greater than 0.8 seconds) before pressing another light-control switch, the controller 110 may return to "normal mode" operation. A flow chart illustrating the steps performed in the "dimmer mode" is further illustrated in FIG. 11.

The fan speed switches featured on the front surface 400 of the portable remote controller 110 are "Low" switch 406, "Medium" switch 407, and "High" switch 408. In one embodiment of the invention, when the "Low" switch 406 is pressed, the controller 110 may generate and transmit an encoded control signal to the receiver 106, wherein said control signal instructs the receiver 106 to power the associated fan motor 206 at the defined "Low" speed setting, and in the direction in which the motor 206 is currently operating. The "Low" speed setting is typically defined as the minimal speed for fan blade 208 rotation. When the "Medium" switch 407 is pressed, the controller 110 may generate and transmit an encoded control signal to the receiver 106, wherein said control signal instructs the receiver 106 to power the associated fan motor 206 at the defined "Medium" speed setting, and in the direction in which the motor 206 is currently operating. The "Medium" speed setting is typically defined as a speed for fan blade 208 rotation greater than the "Low" speed, but less than the "High" speed. When the "High" switch 408 is pressed, the controller 110 may generate and transmit an encoded control signal to the receiver 106, wherein said control signal instructs the receiver 106 to power the associated fan motor 206 at the defined "High" speed setting, and in the direction in which the motor 206 is currently operating. The "High" speed setting is typically defined as the maximum speed for fan blade 208 rotation.

The front surface 400 of the portable controller 110 further features fan control switches "Stop" switch 409, and "Reverse" switch 410. In one embodiment of the invention, when the "Stop" switch 409 is pressed, the controller 110 may generate and transmit an encoded control signal to the receiver 106, wherein said control signal instructs the receiver 106 to power off the associated fan motor 206. When the "Reverse" switch 410 is pressed, the controller 110 may generate and transmit an encoded control signal to the receiver 106, wherein said control signal instructs the receiver 106 to power the associated fan motor 206 in the opposite direction and same speed in which it is currently operating, effectively reversing the direction of fan blade 208 rotation.

Figure 4B:
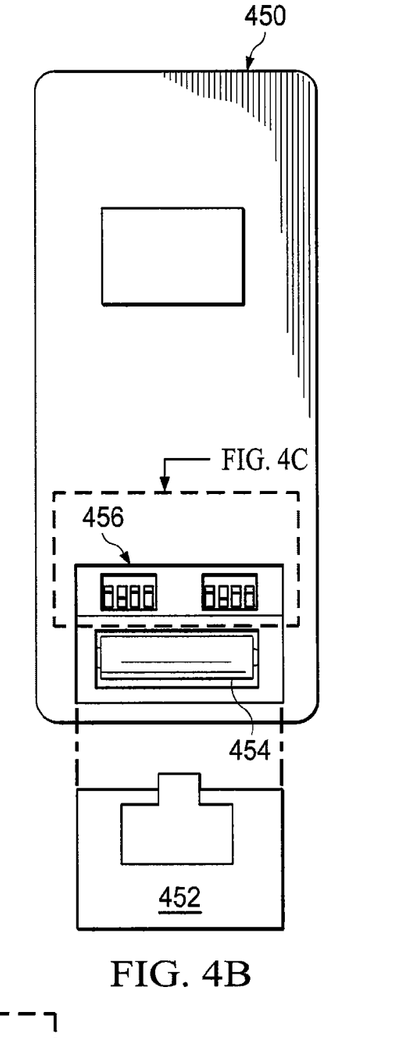
Figure 4C:
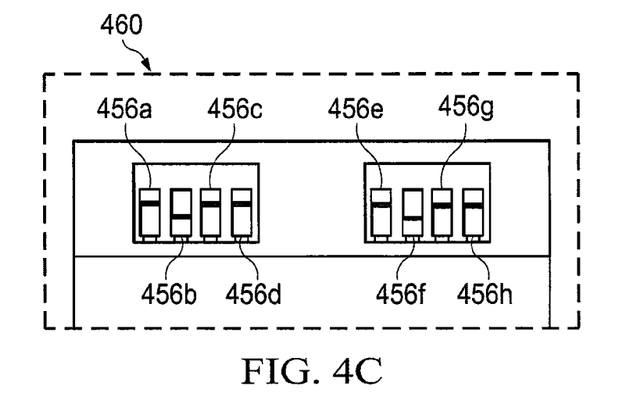

FIG. 4B additionally includes a back surface view 450 of the controller 110 featuring a removable cover 452, a battery compartment 454, and a set of code toggle switches 456. FIG. 4C is the back surface view 450 further including an enlarged view 460 of the code toggle switches 456. The enlarged view 460 illustrates eight individual code toggle switches 456a-h. Because there are eight individual code toggle switches 456a-h, the signal encoding device is said to have 8-bit encryption, meaning there are $2^8$, or 256 possible signal encoding code combinations. In one embodiment of the invention, the signal encoding code for the portable controller 110 is determined by setting each individual code toggle switch 456 to either an "On" or "Off" position.

Figure 5:
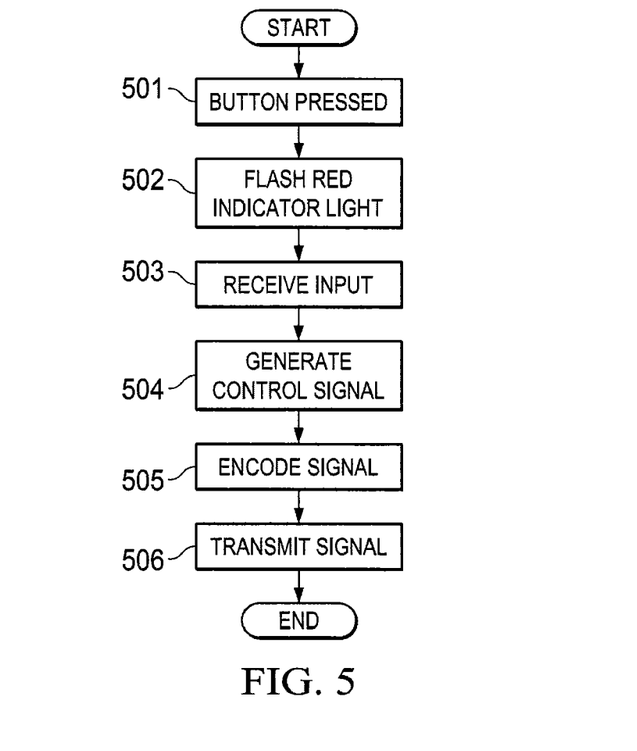
FIG. 5 is a process flow diagram of the steps performed by an exemplary embodiment of a portable controller.

When DC power is supplied to the controller 110, it continuously waits for a user input. Once a switch is pressed, the controller 110 follows the process flow illustrated in FIG. 5. The controller 110 receives a user input once the user has pressed a control switch (501). While the switch is pressed, the red indicator light 411 flashes (502), and the controller 110 receives the user input command (503). A microprocessor inside the controller 110 generates a control instruction based on which switch was pressed, and embeds the instruction in a control signal (504). The microprocessor then encodes said control signal (505), and transmits the control signal (506) to the receiver 106. The encoding code used to encode the control signal is determined by the settings of the individual code toggle switches 456a-h. After the control signal is sent to the receiver 106, the controller 110 returns to its original state wherein it waits for a user input.

Stationary Controller

Figure 6A:
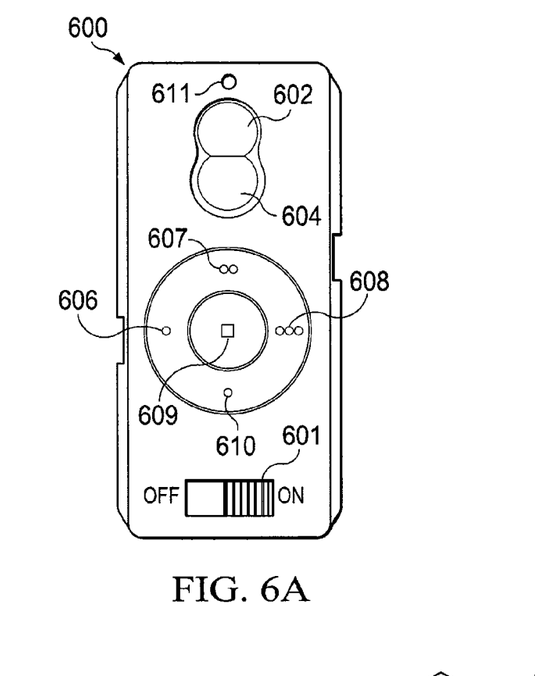
FIGS. 6A, 6B, and 6C are diagrams illustrating an exemplary user interface and code switches for a stationary controller of the control system.

FIG. 6A illustrates the exemplary stationary controller 102 used to control the ceiling fan system 200 represented in FIG. 1. The front surface 600 of the controller 102 features a plurality of switches acting as the user interface system, wherein the light-controlling switches 602 and 604 control the illumination of the light fixtures 202 and 204 on the ceiling fan system 200, and the fan-controlling switches 606, 607, 608, 609, and 610 provide the fan motor 206 with the desired speed and direction of fan blade 208 rotation. The front surface 600 further features a power switch 601, and an indicator light 611 that illuminates to inform the user that the controller 102 has recognized that a switch is pressed.

The light-controlling switches featured on the front surface 600 of the stationary controller 102 are "Up-Light" switch 602 and "Down-Light" switch 604. In one embodiment of the invention, when the "Up-light" switch 602 is pressed and held for less than a predetermined period of time (e.g., 0.7 seconds), the controller 102 may operate in "normal mode," and generate and transmit an encoded control signal to the receiver 106, wherein said control signal instructs the receiver 106 to power on the fan's associated lower 202 and upper 204 light fixtures. If the light fixtures 202 and 204 are already powered on, this control instruction turns the power off to the light fixtures 202 and 204. In another embodiment of the invention, when the "Down-light" switch 604 is pressed and held for less than a predetermined period of time (e.g., 0.7 seconds), the controller 102 may operate in "normal mode," and generate and transmit an encoded control signal to the receiver 106, wherein said control signal instructs the receiver 106 to power off the light fixtures 202 and 204. If the light fixtures 202 and 204 are already powered off, this control instruction turns the power on to the light fixtures 202 and 204.

In accordance with an embodiment of the invention, when either the "Up-Light" switch 602 or the "Down-Light" switch 604 is pressed and held for more than a predetermined period of time (e.g., 0.7 seconds), the receiver 106 enters "dimmer mode." The receiver 106 operates in "dimmer mode" until returning to the "normal mode" operation. When the light-controlling switches "Up-Light" 602 and "Down-Light" 604 are pressed while the controller is operating in "dimmer mode," the light control switches gradually adjust the illumination intensity of the light fixtures 202 and 204, wherein said adjustment of light intensity varies periodically (e.g., every 0.8 seconds). For example, if the stationary controller 102 is operating in "dimmer mode," and the user presses the "Up-Light" switch 602, the controller 102 may generate and transmit an encoded control signal to the receiver 106. Upon receiving this signal, the receiver 106 gradually increase the intensity, or brightness, of the fan's associated light fixtures 202 and 204. Once the light fixtures 202 and 204 reach the maximum intensity, the intensity will pause briefly, then cycle though a dimming phase for the light fixtures 202 and 204. Similarly, after the light reaches its minimum intensity in the dimmer cycle, the receiver will start gradually increasing the intensity of light. This cycle will continue until a button is released on the controller. Further, if the receiver 106 is operating in "dimmer mode," and the user presses the "Down-Light" switch 604, the controller 102 generates and transmits an encoded control signal to the receiver 106. Upon receiving this signal, the receiver 106 gradually decreases the intensity of the light fixtures 202 and 204. Once the light fixtures 202 and 204 reach the minimum intensity, the intensity will pause briefly, then cycle though a brightening phase for the light fixtures 202 and 204. The cycle of dimming and brightening will continue until a button is released on the controller.

In accordance with one embodiment of the invention, the gradual change in light intensity may continue for as long as the user depresses a light-control switch while the controller 102 is operating in "dimmer mode." In accordance with another embodiment of the invention, when the controller 102 is operating in "dimmer mode," and the user waits for more than a predetermined period of time (e.g., 0.8 seconds) before pressing another light-control switch, the receiver 106 may return to "normal mode" operation. Instruction processing for the "dimmer mode" is further illustrated in FIG. 11.

The fan speed switches featured on the front surface 600 of the stationary controller 102 are "Low" switch 606, "Medium" switch 607, and "High" switch 608. In one embodiment of the invention, when the "Low" switch 606 is pressed, the controller 102 may generate and transmit an encoded control signal to the receiver 106, wherein said control signal instructs the receiver 106 to power the associated fan motor 206 at the defined "Low" speed setting, and in the direction in which the motor 206 is currently operating. When the "Medium" switch 607 is pressed, the controller 102 may generate and transmit an encoded control signal to the receiver 106, wherein said control signal instructs the receiver 106 to power the associated fan motor 206 at the defined "Medium" speed setting, and in the direction in which the motor 206 is currently operating. When the "High" switch 608 is pressed, the controller 102 may generate and transmit an encoded control signal to the receiver 106, wherein said control signal instructs the receiver 106 to power the associated fan motor 206 at the defined "High" speed setting, and in the direction in which the motor 206 is currently operating.

The front surface 600 of the stationary controller 102 further features fan control switches "Stop" switch 609, and "Reverse" switch 610. In one embodiment of the invention, when the "Stop" switch 609 is pressed, the controller 102 may generate and transmit an encoded control signal to the receiver 106, wherein said control signal instructs the receiver 106 to power off the associated fan motor 206. When the "Reverse" switch 610 is pressed, the controller 102 may generate and transmit an encoded control signal to the receiver 106, wherein said control signal instructs the receiver 106 to power the associated fan motor 206 in the opposite direction and same speed in which it is currently operating, effectively reversing the direction of fan blade 208 rotation. Also featured on the front surface 600 of the stationary controller 102 is the On/Off power switch 601. In accordance with one embodiment of the invention, when the power switch 601 is turned to the "On" position, AC power is supplied to both the stationary controller 102 and the receiver 106. Conversely, when the power switch 601 is turned to the "Off" position, AC power is not supplied to either the stationary controller 102 or the receiver 106

Figure 6B:
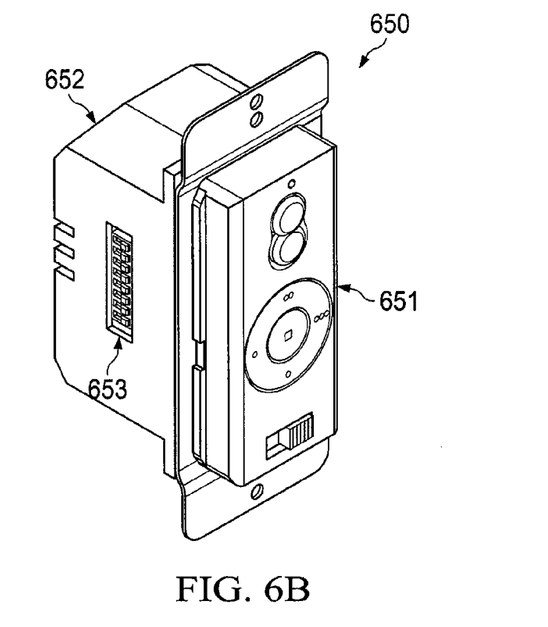
Figure 6C:
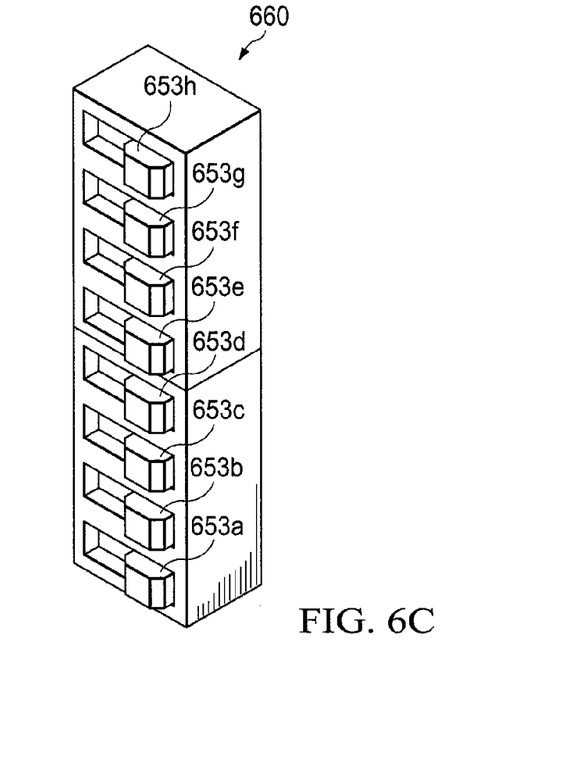

FIG. 6B additionally includes a perspective view 650 of the entire stationary controller 102 unit, featuring the user interface 651 of the controller 102, the mounting unit 652, and a set of code toggle switches 653. FIG. 6C is the side view 650 further including an enlarged view 660 of the code toggle switches 653. The enlarged view 660 illustrates eight individual code toggle switches 653*a-h*. In one embodiment of the invention, the signal encoding code for the stationary controller 102 is determined by setting each individual code toggle switch 653 to either an "On" or "Off" position.

Figure 7:
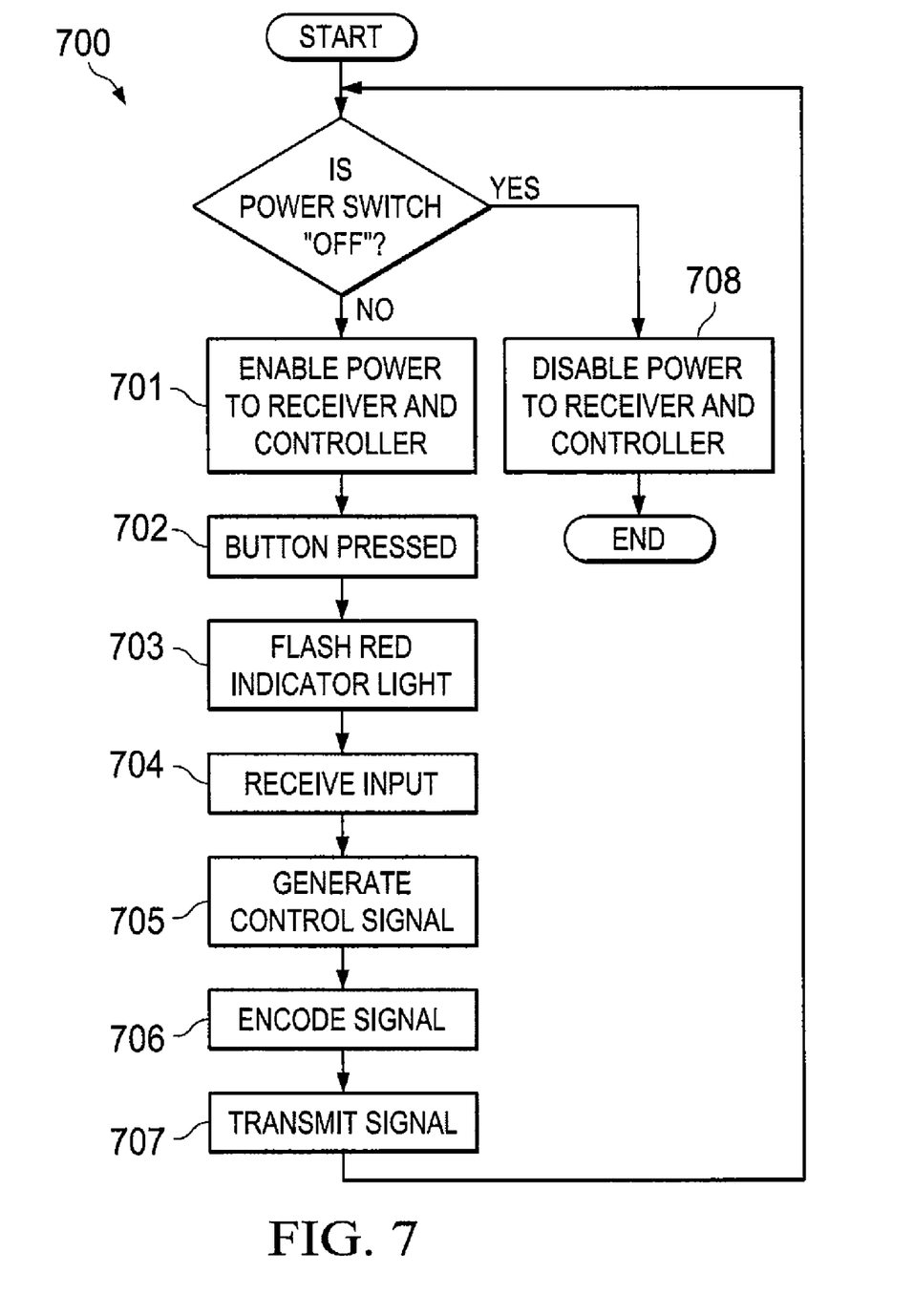
FIG. 7 is a process flow diagram of the steps performed by an exemplary embodiment of the stationary controller embodiment.

FIG. 7 is a process flow diagram 700 of representative steps taken by the stationary controller 102. When the power switch 601 is turned to the "On" setting, AC power is supplied to the stationary controller 102 and the receiver 106 (701). When powered on, the controller 102 continuously waits for a user input. Once a user has pressed a control switch (702), the red indicator light 611 flashes (703), and the controller 102 receives the user input command (704). A microprocessor inside the controller 102 generates a control instruction based on which switch was pressed, and embeds the instruction in a control signal (705). The microprocessor then encodes said control signal (706), and transmits the encoded signal (707) to the receiver 106. The encoding code used to encode the control signal of the stationary controller 102 is determined by the settings of the individual code toggle switches 653*a-h*. After the control signal is sent to the receiver 106, the controller 102 returns to its original state where it waits for a user input. In accordance with one embodiment of the invention, when the stationary controller 102 recognizes that the power switch is turned to the "Off" position, AC power to the receiver 106 and stationary controller 102 is disabled (708).

Receiver

Figure 8:
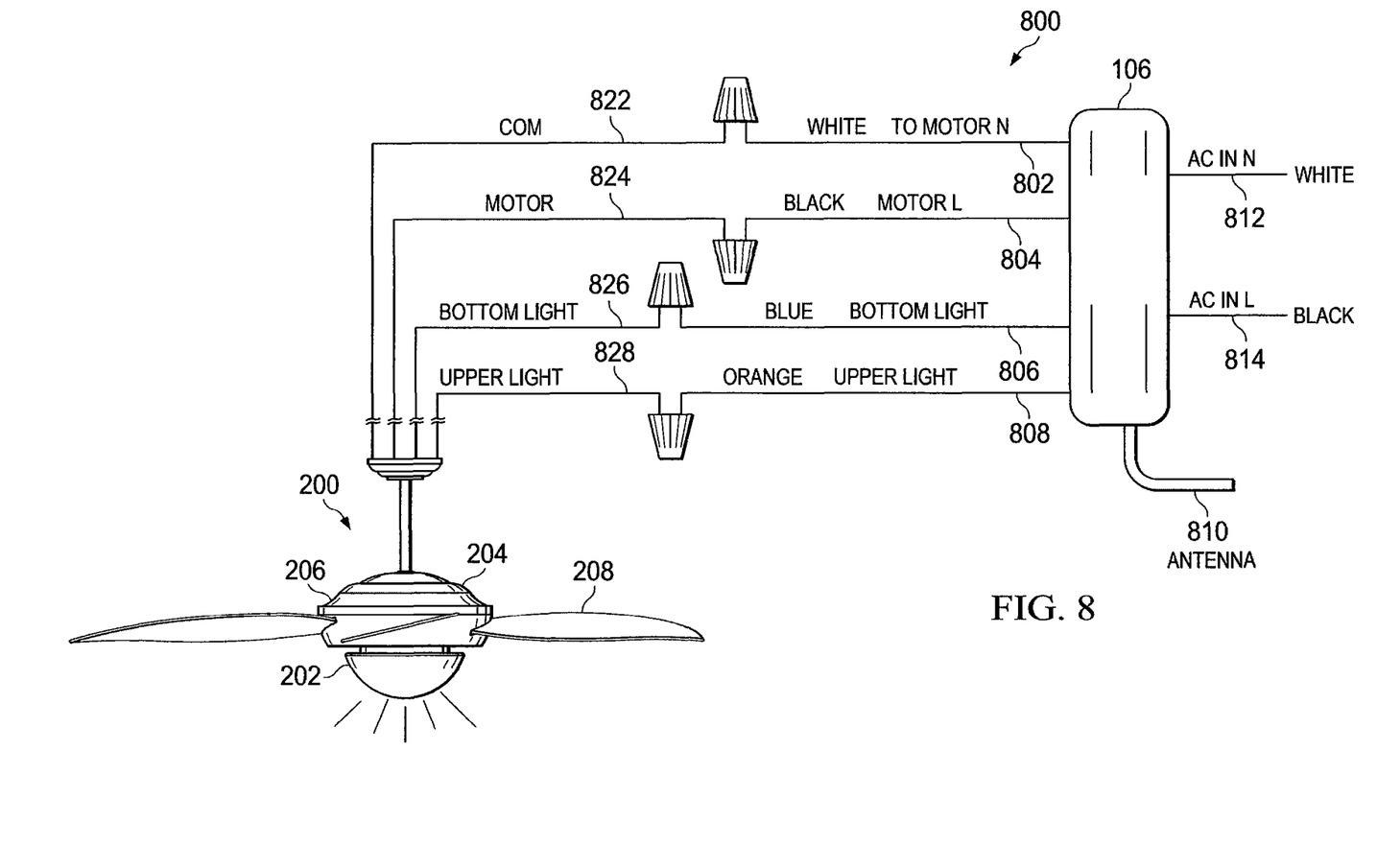
FIG. 8 is a schematic diagram of the connections between a ceiling fan system and a receiver.

A connection diagram 800 of one embodiment of the receiver 106 and ceiling fan system 200 is illustrated in FIG. 8, wherein said receiver 106 includes an antenna 810 for receiving RF transmissions, a white motor N wire 802, a black motor L wire 804, a blue bottom light wire 806, an orange upper light wire 808, a white AC in N wire 812, and a black AC in L wire 814. The receiver 106 is wired to a ceiling fan system 200, wherein said fan system 200 includes a motor 206 for controlling fan blade 208 rotation, one or more lower light fixtures 202, an upper-light fixture 204, and fan blades 208. The ceiling fan system 200 further includes a white COM wire 822, black MOTOR wire 824, blue bottom light wire 826, and orange upper light wire 828.

In accordance with an embodiment of the invention, the receiver 106 is directly wired to the ceiling fan system 200 and AC power supply 104. The white AC in N wire 812, and black AC in L wire 814 connect to the AC power supply 104, thus providing power to the receiver 106. Connecting the white motor N wire 802 to the white COM wire 822, and connecting the black motor L wire 804 to the black MOTOR wire 824 supplies AC power to the fan system 200, and allows the receiver 106 to control the operation of the fan motor 206. Connecting the blue bottom light wire 806 to the blue bottom light wire 826 allows the receiver 106 to control the operation of the lower light fixture 202, while connecting the orange upper light wire 808 to the orange upper light wire 828 allows the receiver 106 to control the operation of the upper light fixture 204.

According to one embodiment of the invention, the receiver 106 may comprise an RF or IR receiving device designed to receive wireless signals from a portable controller 110. A micro-controller, such as the commercially available MDT10P21 8-bit micro-controller sold by Micro Design Technology Co., may also be incorporated into the receiver 106 to process signals received by the receiving device and control the operations of the electronic device, such as a ceiling fan. An EEPROM memory device, such as the commercially available HT93LC46 CMOS EEPROM device sold by Holtek, may also be incorporated into the receiver 106 to receive and store codes for programming the receiver 106. A decoding device, such the commercially available HT12D decoder, may be further incorporated into the receiver 106 to decode signals sent from the portable controller 110 to the receiver 106.

Figure 9:
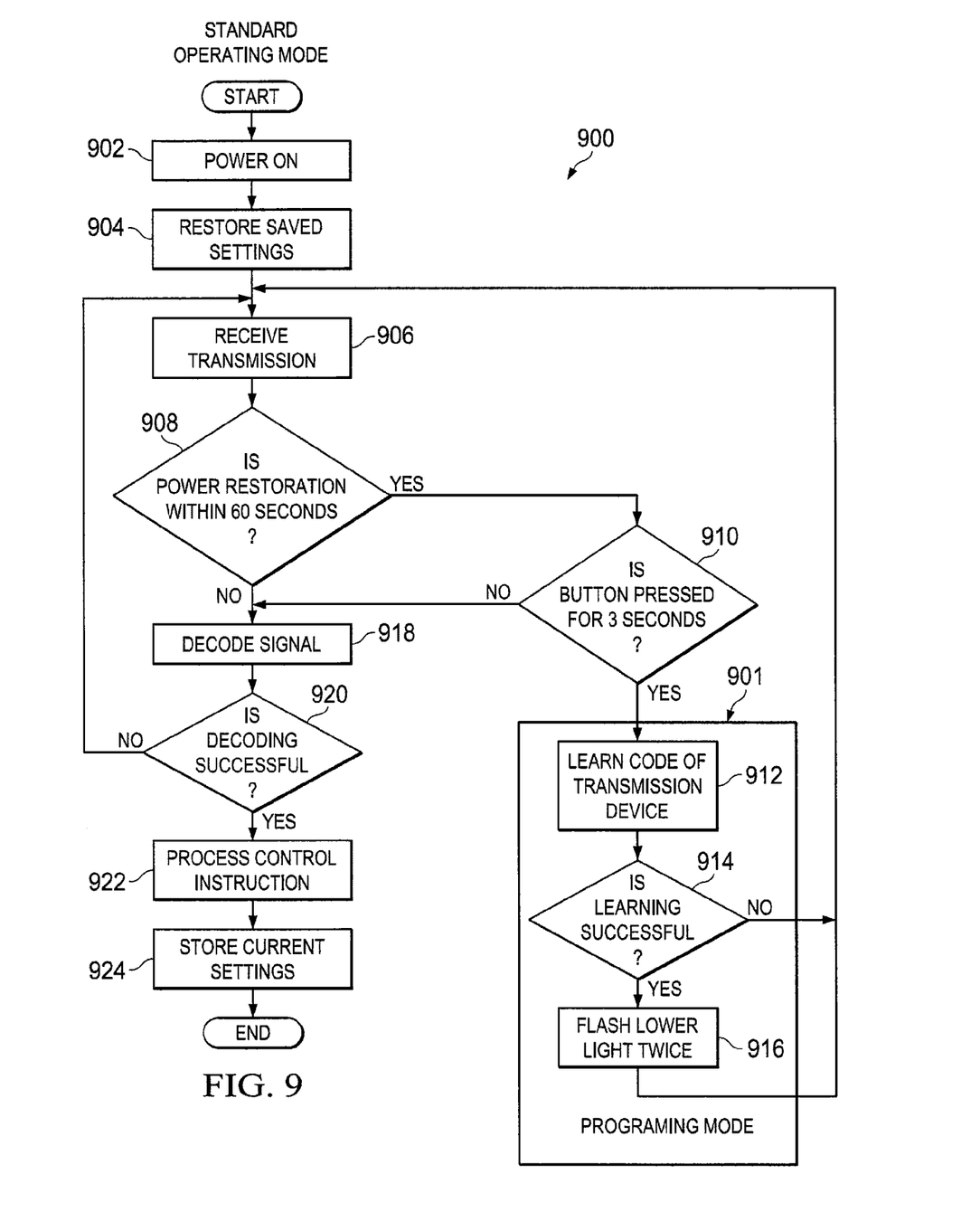
FIG. 9 is a process flow diagram of the steps performed by an exemplary embodiment of the receiver.

In addition to the previously described "dimmer mode," the receiver 106 may also operate in a programming mode 901 and standard mode 900. While in standard mode 900, the receiver 106 simply executes the control commands it receives from either the stationary controller 102 or the remote controller 110. While in programming mode 901, the receiver 106 learns the code used by the controlling device (e.g. the stationary control 102 or the remote control 110) so that the corresponding instructions can be decoded and executed. To enter programming mode 901, AC power 104 is disconnected and restored to the receiver 106, and within a first predetermined period of time (e.g., 60 seconds) after power restoration, the user presses and holds a switch on the controller (102 or 110) longer than a second period of time (e.g., 3 seconds). As illustrated in FIG. 9, once the receiver 106 is in programming mode 901, it automatically learns and stores the code of said programming controller (912). If the code is successfully programmed (914), the receiver 106 will flash the lower light fixture 202 two times (916). The receiver 106 then returns to standard operation mode 900 and waits for a control instruction.

The process flow diagram 900 illustrated in FIG. 9, shows both the standard operating mode 900 and the programming operation mode 901 for the controller system. Information processing for the receiver 106 begins when the unit is powered on. In accordance with an embodiment of the invention, once the receiver 106 is powered on (902), the previous settings (e.g. light intensity and fan speed settings) are applied (904). For example, if the light fixtures 202 and 204 were at full brightness and the fan speed was set to medium when the receiver 106 was powered off, these same settings would be applied once the power was turned back on. Once the settings are restored (904), the receiver 106 waits for the user to press a switch on either the stationary controller 102 or the portable controller 110 to send a control signal. Once a control signal is received (906), a microprocessor located inside the receiver 106 determines if the power has been restored within a first predetermined period of time (e.g., 60 seconds) (908). If power has been restored within that first period of time, the receiver 106 microprocessor determines if the user pressed (and held down) the switch for longer than a second predetermined period of time (e.g., 3 seconds)(910). If the user did press and hold the switch for longer than the second period of time (e.g., 3 seconds), then the receiver 106 enters programming mode 901; otherwise, the receiver 106 attempts to decrypt the control signal (918). If the control signal decryption is not successful, the receiver discards the control instruction and waits for a user input. If the control signal decryption is successful, then the microprocessor of the receiver 106 processes and executes the control instruction (922), and stores the fan system's 200 updated settings in an onboard memory storage location (924) inside the receiver 106. In one embodiment of the invention, the fan system's 200 saved settings will be restored (904) in the event power to the control system 106 is reset.

Figure 10A:
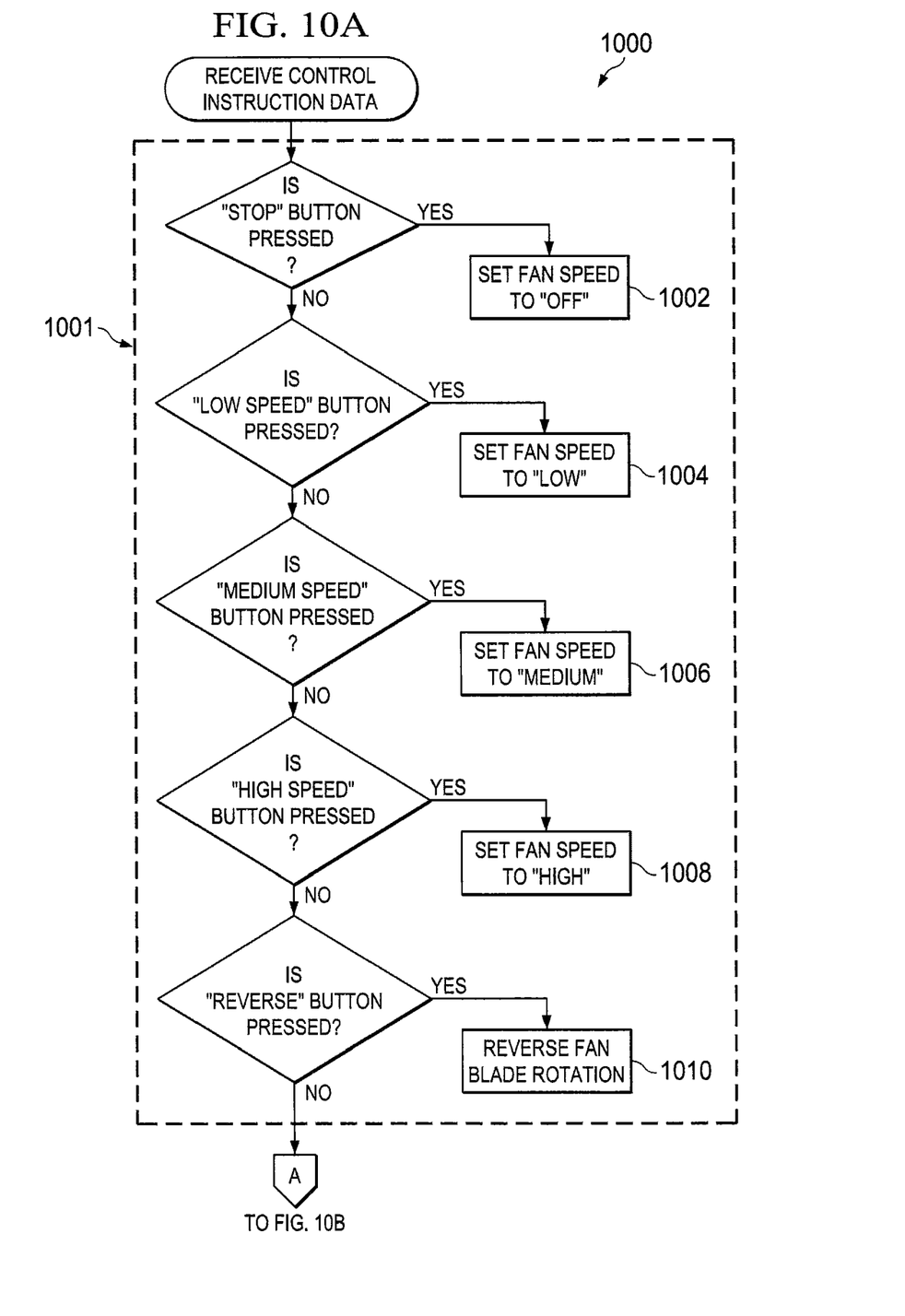
FIGS. 10A and 10B illustrate an exemplary embodiment of a process flow diagram for the "Process Control Instruction" step of FIG. 9.
Figure 10B:
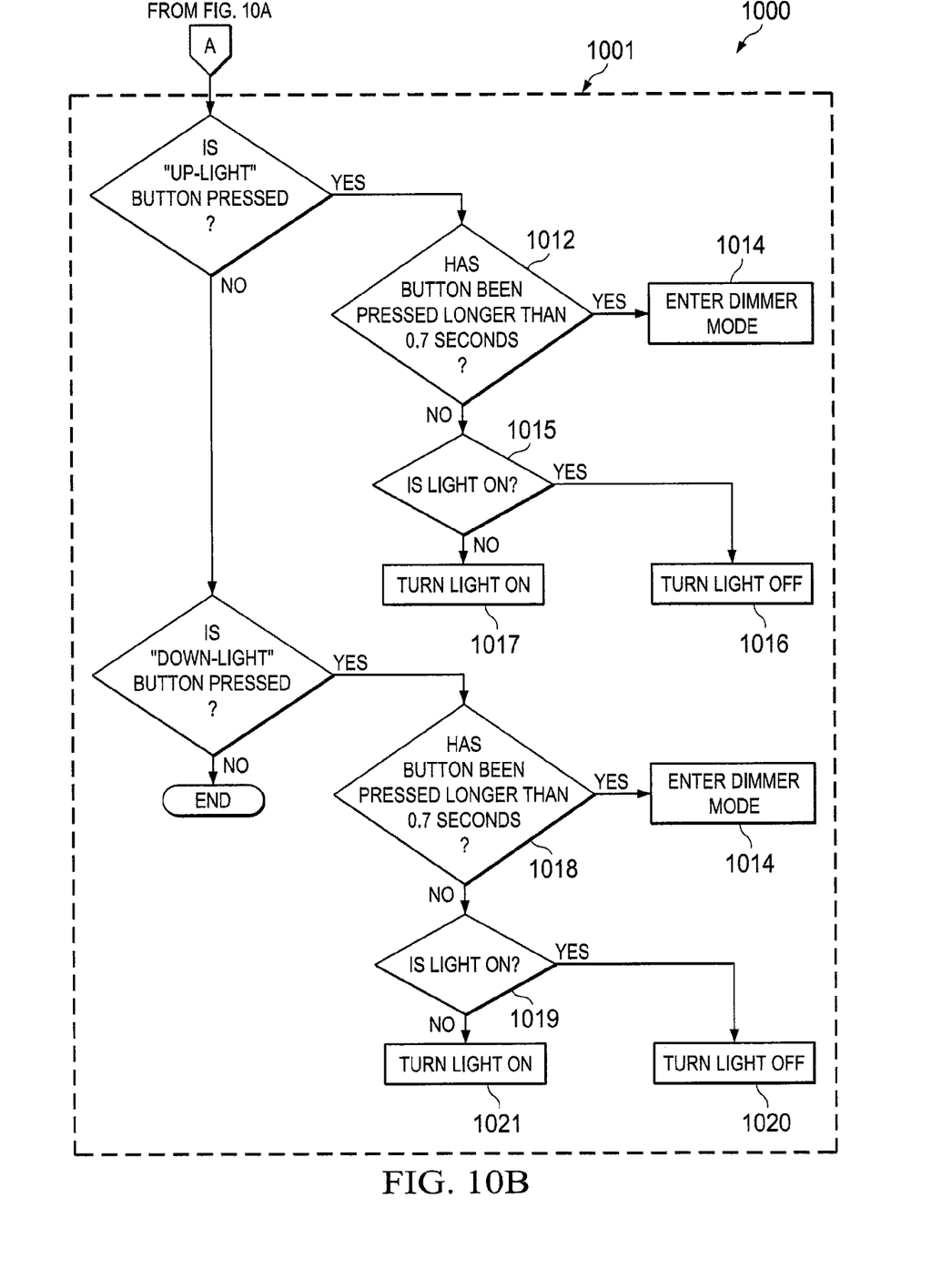

The "Process Control Instruction" step 922 of FIG. 9 is further detailed in the process flow diagram 1000 in FIGS. 10A and 10B. Once the user has pressed a switch, and the control instruction is successfully decoded (920), the microprocessor in the receiver 106 processes, or executes, the control instruction (922). To execute the control instruction, the microprocessor determines which switch was pressed by the user (1001), and then performs the corresponding action. In accordance with one embodiment of the invention, if the fan "Stop" switch 409 or 609 is pressed, the fan speed is set to "Off" (1002). If the fan "Low Speed" switch 406 or 606 is pressed, the fan speed is set to "Low" (1004). If the fan "Medium Speed" switch 407 or 607 is pressed, the fan speed is set to "Medium" (1006). If the fan "High Speed" switch 408 or 608 is pressed, the fan speed is set to "High" (1008). If the fan "Reverse" switch 410 or 610 is pressed, the direction of fan blade 208 rotation is reversed (1010).

As illustrated in FIG. 10B, if the "Up-Light" switch 402 or 602 is pressed, the processor determines if the switch was held down for longer than a predetermined period of time (e.g., 0.7 seconds) (1012). If the switch was pressed and held for longer than the period of time (e.g., 0.7 seconds), the receiver 106 enters "dimmer mode" (1014). If the button was not pressed for longer than the period of time, the processor next determines if the light is currently on (1015). If the light is on, then the processor sends an instruction to turn the light off (1016). If the light is off, then the processor sends an instruction to turn the light on (1017). Additionally, if the "Down-Light" switch 404 or 604 is pressed, the processor first determines if the switch was held down for longer than a predetermined period of time (e.g., 0.7 seconds) (1018). If the switch was pressed and held for longer than the period of time (e.g., 0.7 seconds), the controller 106 enters "dimmer mode" (1014). If the button was not pressed for longer than the period of time, the processor next determines if the light is currently on (1019). If the light is on, then the processor sends an instruction to turn the light off (1020). If the light is off, then the processor sends an instruction to turn the light on (1021).

Figure 11:
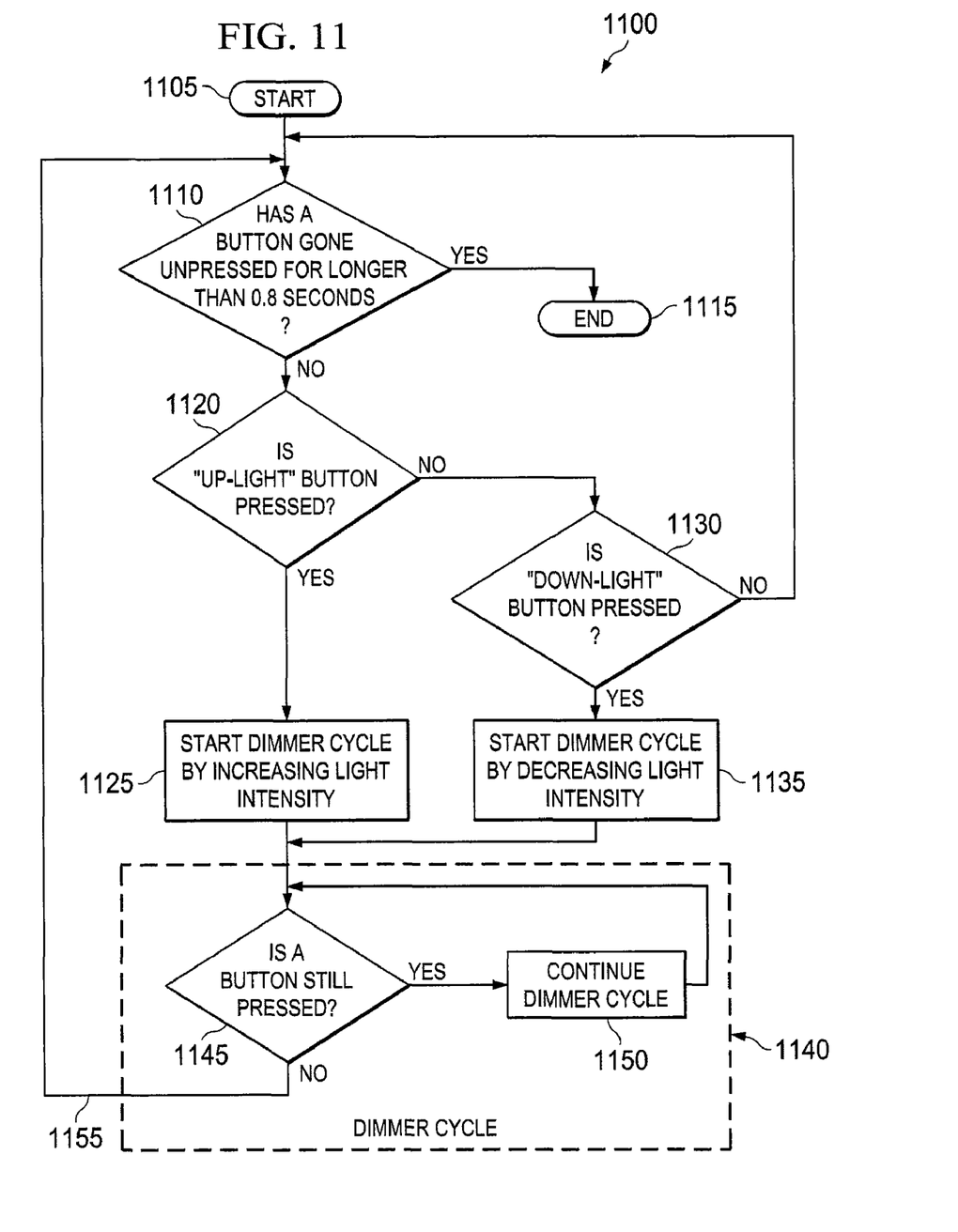
FIG. 11 is an exemplary embodiment of a process flow diagram for the "Enter Dimmer Mode" step of FIG. 10B.

The "Enter Dimmer Mode" module 1014 of FIG. 10B is further described by the flow chart diagram 1100 in FIG. 11. The "dimmer mode" process starts (1105) by checking to see if one of the up-light or down-light buttons have gone unpressed for longer than a predetermined period of time (e.g., 0.8 seconds) (1110). If so, then the receiver exits the dimmer mode of operation (1115). If one of the buttons has not gone unpressed for longer than the predetermined period of time, then the receiver checks to see if the up-light button is pressed (1120). If the up-light button is pressed, then the receiver starts the dimmer cycle by increasing the light intensity (1125). If the up-light button is not pressed, then the receiver checks to see if the down-light button is pressed (1130). If the down-light button is pressed, then the receiver starts the dimmer cycle by decreasing the light intensity (1135). The dimmer cycle (1140) operates by gradually increasing or decreasing the intensity of the light until the button is no longer pressed. If the button is continually pressed (1145), then the dimmer cycle will continue (1150). If the button is released (1145), then the receiver will exit the dimmer cycle 1140 and revert to step 1110 as shown by arrow 1155. After the light reaches its maximum intensity in the dimmer cycle, the receiver will start gradually decreasing the intensity of the light. Similarly, after the light reaches its minimum intensity in the dimmer cycle, the receiver will start gradually increasing the intensity of the light. This cycle will continue until a button is released on the controller, as shown in step 1145.

The foregoing embodiments and advantages are merely exemplary, and are not to be construed as limiting the present disclosure. The present teaching can be readily applied to other types of apparatuses. The description of the present disclosure is intended to be illustrative. Many alternatives, modifications, and variations will be apparent to those skilled in the art. Various changes may be made without departing from the spirit and scope of the present invention. Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

I claim:

1. A system for controlling the operational status of an electronic device, the system comprising:
   a receiver comprising a decoding device that is connected to a receiver, the electronic device, and a first code memory device, wherein the receiver is configured to operate in a first operating mode and a second operating mode,
   wherein the receiver performs the following steps a) through d) in the first operating mode:
   a) receiving an encoded instruction transmitted by a controller;
   b) providing the encoded instruction to the decoding device;
   c) identifying a code in the encoded instruction at the decoding device; and
   d) storing the identified code in the first code memory device;
   wherein the receiver operates in the first operating mode for a period of about one minute;
   wherein the receiver performs the following steps e) through h) in the second operating mode:
   e) receiving an encoded instruction transmitted by a controller;
   f) providing the encoded instruction to the decoding device;
   g) decoding the encoded instruction with a code provided by the first code memory device; and
   h) providing the decoded instruction to the electronic device.

2. A system according to claim 1, wherein the electronic device comprises a ceiling fan wherein the step of providing the decoded instruction to the electronic device changes the speed of the ceiling fan.

3. A system according to claim 2, wherein the electronic device further comprises a light attached to the ceiling fan, wherein the step of providing the decoded instruction to the electronic device changes the illumination of the light.

4. A system according to claim 3, wherein the second operating mode further comprises the following steps i) through j):
   i) if an up-light control switch is activated on a controller, then providing a decoded instruction to the electronic device that turns on the light; and
   j) if a down-light control switch is activated on a controller, then providing a decoded instruction to the electronic device that turns off the light.

5. A system according to claim 1, further comprising a controller comprised of an encoding device that is connected to a transmitter, at least one control switch, and a second code memory device, wherein the encoding device is operable to receive a control instruction from a control switch and encode the instruction with a code provided by the second code memory device, and wherein the transmitter is operable to transmit the encoded instruction received from the encoding device.

6. A system according to claim 5, wherein the second code memory device comprises a plurality of switches that are connected to the encoding device.

7. A system according to claim 6, wherein the second code memory device comprises an 8-bit DIP switch.

8. A system according to claim 1, wherein the first code memory device comprises an electrically programmable memory device.

9. A system according to claim 8, wherein the first code memory device comprises an EEPROM device having at least 8 bits of memory.

10. A system according to claim 1 wherein steps c) and d) are performed only if one of the control switches of the controller has been activated for at least a second period of time.

11. A system according to claim 10 wherein the second period of time is three seconds.

12. A system according to claim 4, wherein the second operating mode of the receiver further comprises the steps of:
   if a light control switch has been activated for longer than a third period of time, then entering a dimmer mode of operation of the receiver, the dimmer mode comprising the following steps k) through m):
   k) if an up-light control switch is activated, then providing a decoded instruction to the electronic device that increases the illumination of the light;
   l) if a down-light control switch is activated, then providing a decoded instruction to the electronic device that decreases the illumination of the light; and
   m) if both of the light control switches have been deactivated for longer than a fourth period of time, then exiting the dimmer mode of the receiver.

13. A system according to claim 12, wherein the third period of time is about 0.7 seconds and the fourth period of time is about 0.8 seconds.

14. A system for controlling the operational status of an electronic device, the system comprising:
   a receiver comprising a decoding device that is connected to a fan speed controller, a fan direction controller, a light controller, and a code memory device,
   wherein the receiver operates in a first operating mode for a first period of time after being powered on, wherein the receiver performs the following steps in the first operating mode:
   receiving an encoded instruction from a controller;
   providing the encoded instruction to the decoding device;

if a control switch of the controller has been activated for at least a second period of time, then performing steps a) and b);
  a) identifying a code in the encoded instruction at the decoding device; and
  b) storing the identified code in the code memory device;
if one of the control switches of the receiver has been activated for less than the second period of time, then performing steps c) and d);
  c) decoding the encoded instruction with a code provided by the code memory device; and
  d) providing the decoded instruction to one of the fan speed controller, the fan direction controller, and the light controller;
wherein the receiver operates in a second operating mode after the first period of time has elapsed, the second operating mode comprising the following steps:
  receiving an encoded instruction from a controller;
  providing the encoded instruction to the decoding device;
  decoding the encoded instruction with a code provided by the code memory device; and
  providing the decoded instruction to one of the fan speed controller, the fan direction controller, and the light controller.

15. A system according to claim 14, wherein the second operating mode further comprises the following steps e) through f):
  e) if the receiver determines that an up-light control switch on a controller is activated, then providing a decoded instruction to the light controller that turns on the light; and
  f) if the receiver determines that a down-light control switch on a controller is activated, then providing a decoded instruction to the light controller that turns off the light.

16. A system according to claim 14, further comprising a controller comprised of an encoding device connected to a transmitter, a fan speed control switch, a fan direction control switch, an up-light control switch, a down-light control switch, and a first set of code switches,
  wherein the encoding device is operable to receive a control instruction from one of the control switches and encode the instruction with a code provided by the code switches,
  wherein the transmitter is operable to transmit the encoded instruction received from the encoding device.

17. A system according to claim 16, wherein the first set of code switches comprises an 8-bit DIP switch.

18. A system according to claim 14, wherein the code memory device comprises an EEPROM device having at least 8 bits of memory.

19. A system according to claim 14 wherein the first period of time is about one minute after being powered on.

20. A system according to claim 19 wherein the second period of time is about three seconds.

21. A system according to claim 14, wherein the second operating mode of the receiver further comprises the steps of:
  if the receiver determines that a light control switch on a controller has been activated for longer than a third period of time, then entering a dimmer mode of operation for the receiver, the dimmer mode comprising the following steps g) through i):
    g) if the receiver determines that an up-light control switch on the controller is activated, then providing a decoded instruction to the light controller that increases the illumination of the light;
    h) if the receiver determines that a down-light control switch on the controller is activated, then providing a decoded instruction to the light controller that decreases the illumination of the light; and
    i) if the receiver determines that both of the light control switches on the controller have been de-activated for longer than a fourth period of time, then exiting the dimmer mode of the receiver.

22. A system according to claim 21, wherein the third period of time is about 0.7 seconds and the fourth period of time is about 0.8 seconds.

23. A method for programming a receiver to work with a remote controller, comprising the steps of:
  receiving an encoded instruction from a controller at a receiver;
  providing the encoded instruction to a decoding device;
  identifying the code in the encoded instruction at the decoding device;
  storing the identified code in a first code memory device in the receiver;
  providing power to the receiver; and
  during a first period of time after power has been provided to the receiver, performing the steps of identifying the code and storing the identified code only if the receiver determines that a control switch of a controller has been activated for at least a second period of time.

24. A method according to claim 23, wherein the first period of time is about one minute and the second period of time is about three seconds.

25. A method according to claim 23, further comprising the steps of:
  receiving an encoded instruction from a controller at a receiver;
  providing the encoded instruction to a decoding device;
  decoding the encoded instruction at the decoding device with a code provided by a first code memory device;
  providing the decoded instruction to a component of an electronic device.

26. A method according to claim 25, further comprising the steps of:
  if the receiver determines that a light control switch on a controller has been activated for longer than a first period of time, then entering a dimmer mode of operation for the receiver, the dimmer mode comprising the following steps a) through c):
    a) if the receiver determines that an up-light control switch on a controller is activated, then providing a decoded instruction to a light controller that increases the illumination of a light;
    b) if the receiver determines that a down-light control switch on a controller is activated, then providing a decoded instruction to the light controller that decreases the illumination of the light; and
    c) if the receiver determines that both light control switches on a controller have been de-activated for longer than a second period of time, then exiting the dimmer mode of the receiver.

27. A method according to claim 26, wherein the first period of time is about 0.7 seconds and the second period of time is about 0.8 seconds.

* * * * *